United States Patent

[11] 3,634,043

| [72] | Inventor | Stephen Anthony Laurich<br>Warren, Pa. |
|---|---|---|
| [21] | Appl. No. | 808,461 |
| [22] | Filed | Mar. 19, 1969 |
| [45] | Patented | Jan. 11, 1972 |
| [73] | Assignee | Struthers Scientific and International Corporation |
| [32] | Priority | Mar. 19, 1968 |
| [33] | | Great Britain |
| [31] | | 13,252/68 |

[54] VACUUM CRYSTALLIZING OF SOLUTION IN A HYDROCARBON LIQUID IN THE PRESENCE OF WATER
4 Claims, 1 Drawing Fig.

[52] U.S. Cl................................................ 23/295 R,
23/300 R, 159/45, 159/47, 62/58
[51] Int. Cl................................................ B01d 9/00,
B01j 17/00, B01j 9/04, B01d 1/00
[50] Field of Search........................................ 159/45, 47;
23/273, 295, 300, 312, 308, 308 S, 312 S, 293 S;
260/707; 62/58; 208/37, 30

[56] References Cited
UNITED STATES PATENTS

| 3,098,735 | 7/1963 | Clark............................ | 62/58 |
| 3,251,193 | 5/1966 | Wiegandt...................... | 62/58 |
| 2,623,814 | 12/1952 | Gray............................. | 23/273 |
| 2,841,536 | 7/1958 | Egbert........................... | 23/303 X |
| 3,419,899 | 12/1968 | Tufts et al..................... | 159/45 X |
| 2,234,269 | 3/1941 | MacDonald................... | 23/312 S X |

FOREIGN PATENTS

| 366,052 | 7/1930 | Great Britain................ | 23/308 |

*Primary Examiner*—Norman Yudkoff
*Assistant Examiner*—J. Sofer
*Attorney*—William A. Drucker

ABSTRACT: Crystallization of a solid from a hydrocarbon solvent, such as sulfur from kerosene, is accomplished by the direct contact evaporation of water which is introduced into the solution and evaporated therefrom to cool the solution.

PATENTED JAN 11 1972
3,634,043
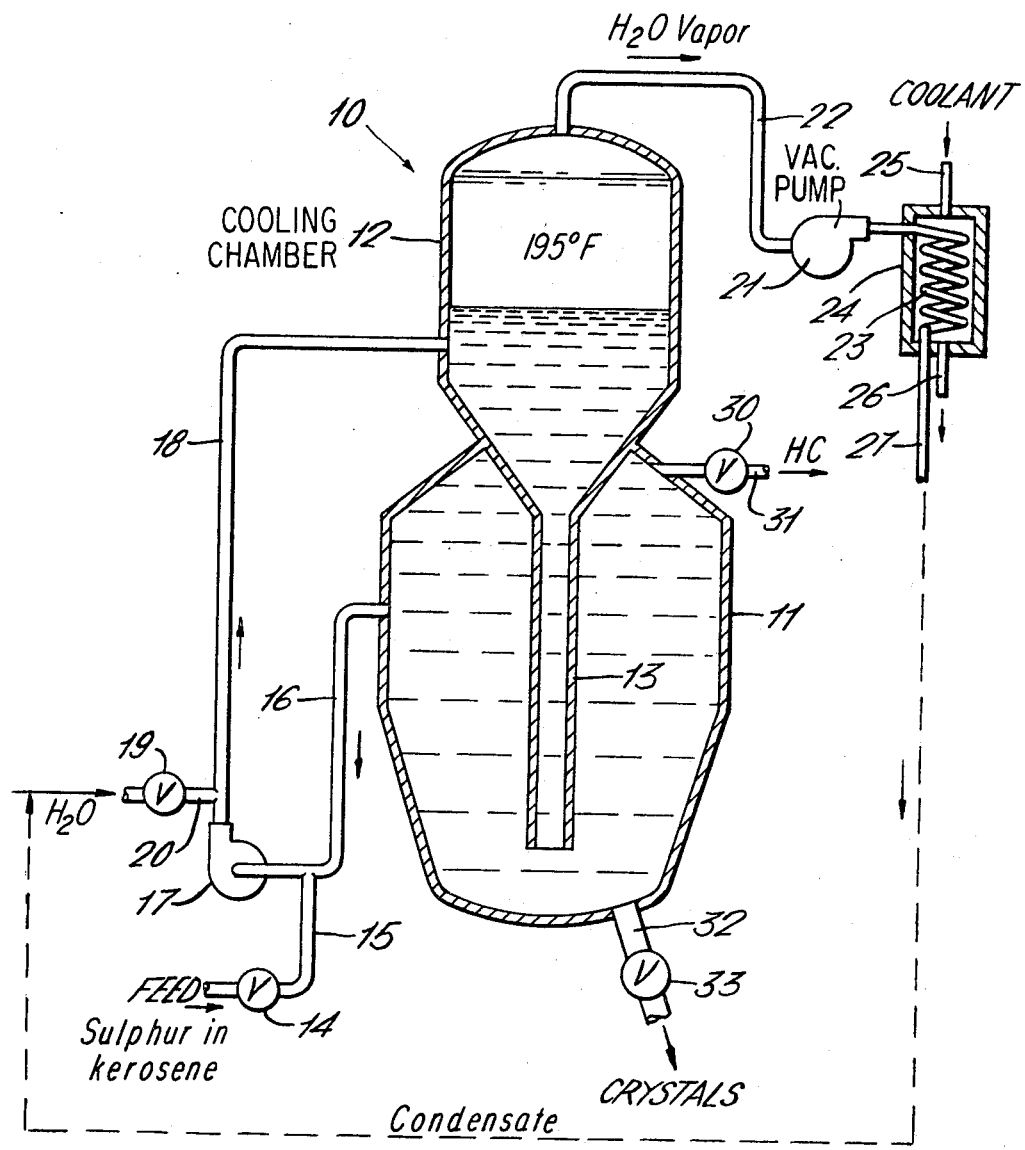

VACUUM CRYSTALLIZING OF SOLUTION IN A HYDROCARBON LIQUID IN THE PRESENCE OF WATER

BACKGROUND OF THE INVENTION

Conventional crystallization of a solid from a hydrocarbon solvent, such as sulfur from kerosene, requires the colling of the solution and the removal of large amounts of heat through heat transfer surfaces. Such heat transfer surfaces will rapidly foul due to deposits of solids which tend to crystallize thereon. In addition, very large heat exchangers are required which are costly.

SUMMARY OF THE INVENTION

A feed solution of a hydrocarbon solvent and a solid in solution therein is recirculated in a crystallizer. To remove heat and crystallize out the solid, water is added to the solution and evaporated in the crystallizer to cool the solution by direct contact. This process both prevents fouling of heat transfer surfaces and results in lower apparatus costs.

BRIEF DESCRIPTION OF THE DRAWING

The FIGURE of the drawing is a longitudinal, vertical section through a crystallizer adapted to practice the process of this invention.

DESCRIPTION OF THE PREFERRED EMBODIMENT

A crystallizer 10 has a lower settling chamber 11 and an upper evaporation cooling chamber 12. An internal tube 13 extends from the evaporation chamber 11 downward into the settling chamber 11. A feed solution may be introduced through valve 14 and pipe 15 into the recirculating line 16. From line 16 pump 17 pumps solution through recirculating line 18 to evaporation cooling chamber 12. Thus pump 17 circulates solution from settling tank 11 to evaporation chamber 12 while, to balance this flow, solution slowly sinks downward in tube 13.

Water is introduced into line 18 by valve 19 and line 20 to flow into evaporation chamber 12 mixed with solution. Pump 21 draws a vacuum in chamber 12 through line 22. This reduces the pressure in chamber 12 so that the water introduced therein mixed with solution evaporates or boils to remove heat from the solution. Thus pump 21 mostly moves water vapor from chamber 12. This water vapor may be passed through a coil 23 in a jacket 24 through which cooling water enters from pipe 25 and leaves from pipe 26. This condenses the water vapor which leaves the system through pipe 27. If desired, this condensed water vapor may be reused by reintroducing it through valve 19 and pipe 20.

As one example of this invention, sulfur dissolved in kerosene at 216° F. is fed into the crystallizer through valve 14 and pipe 15. The mother liquor being circulated from the crystallizer by pump 17 is at a temperature of about 195° F. Water in regulated quantities at a temperature of from 60° to 100° F. is introduced through valve 19 and pipe 20. When the water and solution mixture enters chamber 12, the water evaporates because the pressure in chamber 12 is sufficiently reduced by pump 21 to cause water to boil at the crystallizer operating temperature of 195° F. Sufficient water is evaporated to remove the heat entering the crystallizer in the form of sensible heat of the feed, heat of crystallization, and mechanical heat.

As crystals far formed, they settle in tank 11 and are removed through pipe 32 and valve 33. Hydrocarbon solvent from which solids have been removed may be drawn off through valve 30 and pipe 31.

What is claimed is:

1. The process of the crystallization of a solid from solution in a hydrocarbon solvent comprising the steps of:
   a. recirculating the solution of said hydrocarbon solvent and solid in a crystallizer;
   b. introducing water into the recirculating solution, to form a mixture therewith;
   c. evaporating the water under vacuum from the mixture to cool the solution and crystallize the solid; and
   d. removing the crystallized solid from the crystallizer.

2. The process according to claim 1 wherein the evaporated water is condensed and reintroduced into the recirculating solution.

3. The process according to claim 1, wherein the solvent is kerosene and solid is sulfur.

4. The process according to claim 3 wherein the water is evaporated at about 195° F.

* * * * *